US009660707B2

(12) United States Patent
Yan et al.

(10) Patent No.: US 9,660,707 B2
(45) Date of Patent: May 23, 2017

(54) PRECODING METHOD, BASE STATION AND USER EQUIPMENT

(71) Applicant: Huawei Technologies Co., Ltd., Shenzhen, Guangdong (CN)

(72) Inventors: Hua Yan, Shenzhen (CN); Lei Chen, Shenzhen (CN)

(73) Assignee: Huiawei Technologies Co., Ltd., Shenzhen (CN)

( * ) Notice: Subject to any disclaimer, the term of this patent is extended or adjusted under 35 U.S.C. 154(b) by 358 days.

(21) Appl. No.: 14/476,276

(22) Filed: Sep. 3, 2014

(65) Prior Publication Data

US 2015/0009851 A1   Jan. 8, 2015

Related U.S. Application Data

(63) Continuation of application No. PCT/CN2012/087335, filed on Dec. 24, 2012.

(30) Foreign Application Priority Data

Mar. 6, 2012 (CN) .......................... 2012 1 0057036

(51) Int. Cl.
*H04B 7/04* (2017.01)
*H04L 25/497* (2006.01)
(Continued)

(52) U.S. Cl.
CPC ......... *H04B 7/0456* (2013.01); *H04B 7/0452* (2013.01); *H04B 7/0665* (2013.01);
(Continued)

(58) Field of Classification Search
CPC ............... H04L 25/497; H04L 25/4975; H04L 25/03898; H04B 7/0456
See application file for complete search history.

(56) References Cited

U.S. PATENT DOCUMENTS

2009/0196224 A1   8/2009  Zhang et al.
2010/0190486 A1   7/2010  Kimura et al.
(Continued)

FOREIGN PATENT DOCUMENTS

CN     101321013 A    12/2008
CN     101459635 A     6/2009
(Continued)

*Primary Examiner* — Ashley Shivers
(74) *Attorney, Agent, or Firm* — Leydig, Voit & Mayer, Ltd.

(57) ABSTRACT

Embodiments of the present disclosure provide a precoding method, a base station and a user equipment. The precoding method comprises: a base station acquires predetermined parameter(s) of at least one user equipment; calculates the acquired predetermined parameter(s) to obtain a calculation performance index; selects a target precoding solution according to the calculation performance index; precodes data information of all the user equipment(s) according to the target precoding solution; if the target precoding solution is a nonlinear precoding solution, sends the data information and indication signaling indicating information of the nonlinear precoding solution to each user equipment; and the user equipment receives the data information and the indication signaling which are sent by the base station; selects a receiver according to a receiver type obtained according to the indication signaling; and detects the received data information using the selected receiver.

19 Claims, 6 Drawing Sheets

(51) Int. Cl.
  *H04L 25/03* (2006.01)
  *H04B 7/0456* (2017.01)
  *H04B 7/06* (2006.01)
  *H04W 24/02* (2009.01)
  *H04B 7/0452* (2017.01)

(52) U.S. Cl.
  CPC .. *H04L 25/03343* (2013.01); *H04L 25/03898* (2013.01); *H04L 25/4975* (2013.01); *H04W 24/02* (2013.01)

(56) References Cited

U.S. PATENT DOCUMENTS

| | | |
|---|---|---|
| 2010/0290549 A1 | 11/2010 | Yang et al. |
| 2013/0064150 A1* | 3/2013 | Hirata ................ H04B 7/0665 370/310 |
| 2013/0215992 A1* | 8/2013 | Kazmi ................ H04B 7/0413 375/295 |

FOREIGN PATENT DOCUMENTS

| | | |
|---|---|---|
| CN | 101499986 A | 8/2009 |
| CN | 101682384 A | 3/2010 |
| CN | 101854328 A | 10/2010 |
| EP | 1841112 A1 | 10/2007 |
| EP | 2533449 A1 | 12/2012 |
| WO | WO 2011096138 A1 | 8/2011 |

* cited by examiner

PRECODING METHOD, BASE STATION AND USER EQUIPMENT

CROSS-REFERENCE TO RELATED APPLICATIONS

This application is a continuation of International Patent Application No. PCT/CN2012/087335, filed on Dec. 24, 2012, which claims priority to Chinese Patent Application No. 201210057036.4, filed on Mar. 6, 2012, both of which are hereby incorporated by reference in their entireties.

TECHNICAL FIELD

The present disclosure relates to a communication field, and in particular to a precoding method, a base station and a user equipment.

BACKGROUND

In an existing LTE (Long Term Evolution) system, MIMO (Multiple Input Multiple Output) is a key technology of a physical layer, and is mainly a method of using multiple transmitting antennas and multiple receiving antennas for improving a system performance.

A precoding technology is a very important process of MIMO. Before precoding, the system maps data information to be sent to different layers by layer mapping at first, so that the data information is allocated to the different layers according to a certain mode, and then the system maps the data information allocated to the layers to physical antennas by the precoding technology. In this way, some necessary signal processing processes which are difficult to be implemented at a receiving end may be performed at a sending end, thereby ensuring a signal performance of a transmission process.

An existing precoding technology is actually an adaptive technology. With a change of CSI (Channel State Information), a result of precoding the data information may change correspondingly. This pre-processing technology for the data information changing in real time according to the change of the CSI may enable a UE (User Equipment) to obtain correct target data information from the changing CSI, thus precoding is a very critical technology in the MIMO of the LTE system.

However, performances and complexities of different precoding solutions are different from each other. Typical precoding solutions may be divided into two types: a linear precoding solution and a nonlinear precoding solution, and each type of a precoding solution has a suitable working scene of itself. In existing LTE protocols, an adopted precoding solution is the linear precoding solution, but in some scenes, gain provided by the linear precoding solution is too small to meet a transmission requirement of the system, thereby leading to great decrease of the system performance.

SUMMARY

On one aspect, a precoding method is provided, including:
acquiring predetermined parameter(s) of at least one user equipment;
calculating the acquired predetermined parameter(s) of all the user equipment(s) to obtain a calculation performance index;
selecting and determining a target precoding solution according to the calculation performance index;
precoding data information of all the user equipment(s) according to the target precoding solution; and
sending, if the target precoding solution is a nonlinear precoding solution, the data information and indication signaling indicating information of the nonlinear precoding solution to each user equipment.

On another aspect, a precoding method is provided, including:
receiving data information and indication signaling which are sent by a base station, wherein the indication signaling indicates information of a nonlinear precoding solution selected by the base station;
selecting a receiver according to a receiver type obtained according to the indication signaling; and
detecting the received data information using the selected receiver.

On another aspect, a base station is provided, including:
an acquiring unit, configured to acquire predetermined parameter(s) of at least one user equipment;
a calculating unit, configured to calculate the predetermined parameter(s) of all the user equipment(s) acquired by the acquiring unit to obtain a calculation performance index;
a selecting and determining unit, configured to select and determine a target precoding solution according to the calculation performance index calculated by the calculating unit;
a coding unit, configured to precode data information of all the user equipment(s) according to the target precoding solution determined by the selecting and determining unit; and
a first sending unit, configured to send, if the target precoding solution is a nonlinear precoding solution, the data information and indication signaling indicating information of the nonlinear precoding solution to each user equipment.

On another aspect, a user equipment is provided, including:
a receiving unit, configured to receive data information and indication signaling which are sent by a base station, wherein the indication signaling indicates information of a nonlinear precoding solution selected by the base station;
a selecting unit, configured to select a receiver according to a receiver type obtained according to the indication signaling received by the receiving unit; and
the selected receiver, configured to detect the data information received by the receiving unit.

According to the precoding method, the base station and the user equipment provided by the embodiments of the present disclosure, the base station acquires the predetermined parameter(s) of at least one user equipment, calculates the predetermined parameter(s) to obtain the calculation performance index, then select the target precoding solution according to the calculation performance index, pre-codes the data information according to the target precoding solution, if the target precoding solution is the nonlinear precoding solution, sends the data information and the indication signaling indicating the information of the nonlinear precoding solution to each user equipment; and the user equipment receives the data information and the indication signaling which are sent by the base station, selects the receiver according the receiver type obtained according to the indication signaling, and detects the received data information using the selected receiver. In this way, the base station may select a precoding solution with the optimal gain effect according to actual conditions in the system, and may indicate the receiver type according to the need of the precoding solution simultaneously to ensure correct reception of transmission, thereby improving the transmission quality of the system, and improving the system performance.

BRIEF DESCRIPTION OF DRAWINGS

To illustrate technical solutions in the embodiments of the present disclosure or in the prior art more clearly, a brief introduction on the accompanying drawings which are needed in the description of the embodiments or the prior art will be given below. Apparently, the accompanying drawings in the description below are merely some of the embodiments of the present disclosure, based on which other drawings may be obtained by those of ordinary skill in the art without any inventive efforts.

DESCRIPTION OF EMBODIMENTS

A clear and complete description of technical solutions of the embodiments of the present disclosure will be given below, in combination with the accompanying drawings in the embodiments of the present disclosure. Apparently, the embodiments described below are a part, but not all, of the embodiments of the present disclosure. All of other embodiments, obtained by those skilled in the art based on the embodiments of the present disclosure without any inventive efforts, fall into the protection scope of the present disclosure.

Figure 1:
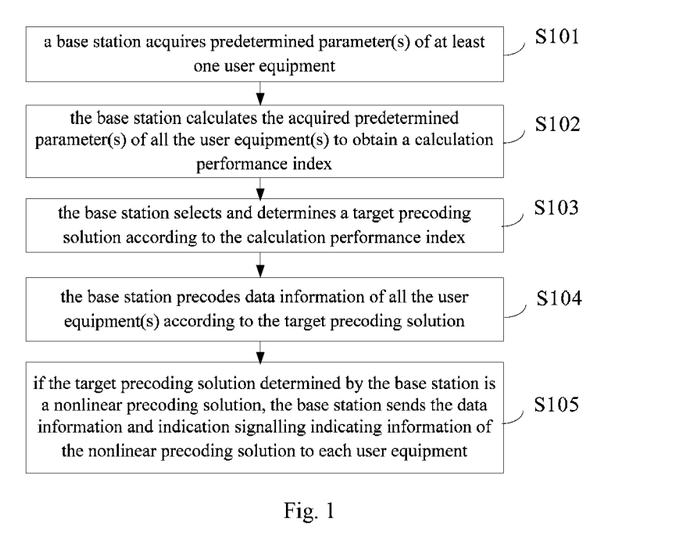
FIG. 1 is a flow schematic diagram of a precoding method provided by an embodiment of the present disclosure.

A precoding method provided by an embodiment of the present disclosure, as shown in FIG. 1, includes the following steps.

S101, a base station acquires predetermined parameter(s) of at least one user equipment.

It should be noted that, the predetermined parameter(s) may include parameter(s) of a channel state and/or a channel quality, wherein the channel state includes a downlink signal-to-noise ratio, a channel correlation and the like parameter, and the channel quality includes CQI (Channel Quality Indicator) and the like. During actual working of a system, the base station may acquire the parameter of the channel state or the channel quality in real time, or acquire the parameters of the channel state and the channel quality in real time by measuring received signal(s) or by receiving feedback of the user equipment, wherein the received signal(s) may be a reference signal or a data signal, or a reference signal and a data signal. Moreover, the predetermined parameter may also be an antenna configuration including the number of receiving antennas, the number of transmitting antennas, a polarization mode and the like parameter, which may be acquired by the base station by virtue of information reported by the user equipment when accessing to a network.

S102, the base station calculates the acquired predetermined parameter(s) of all the user equipment(s) to obtain a calculation performance index.

It is worth pointing out that, in an MIMO (Multiple Input Multiple Output) system, before precoding, the system maps data information to be sent to different layers by layer mapping at first, wherein the "layer" may be regarded as a "virtual antenna", and a purpose of layer mapping is to allocate the data information to different "virtual antennas" according to a certain mode. Then the system maps the data information allocated to the layers to physical antennas by a precoding technology, a purpose of which is to perform some necessary signal processing processes at the base station which are difficult to be implemented at the user equipment, in this way, the base station needs to perform joint calculation on all the user equipments, and perform joint coding on all the user equipments.

It should be noted that, the calculation performance index here is a performance index obtained after calculation, and subsequent steps are comparing and selecting according to the calculation performance index. It is only for distinction from other uncalculated performance index here, and the calculation performance index may be any type of a performance index and not limited thereto.

Further, calculation is performed according to different types of calculation performance indexes. When a type of a performance index unrelated to specific precoding solutions is calculated, it is not needed to perform calculation according to each precoding solution respectively. A preset threshold is needed for this type of the calculation performance index, and a precoding solution is selected according to whether the calculation performance index is greater than or less than the preset threshold. When a type of a performance index related to specific precoding solutions is calculated, it is needed to perform calculation according to each precoding solution respectively, that is, each precoding solution is associated with one calculation performance index. In this case, a threshold value is not needed, instead, it is only needed to compare calculation performance indexes of all the precoding solutions to select a precoding solution with an optimal calculation performance index.

S103, the base station selects and determines a target precoding solution according to the calculation performance index.

It is worth pointing out that, the base station correspondingly uses different preset rules according to which type of the two above-mentioned types the obtained calculation performance index is, to determine the target precoding solution. The first type of the calculation performance index is unrelated to the specific precoding solutions, so it not needed to perform calculation according to each precoding solution respectively. In this case, a preset threshold is needed, and the target precoding solution is determined according to whether the calculation performance index is greater than or less than the preset threshold. The other type of the performance index is related to the specific precoding solutions, so it is needed to perform calculation according to each precoding solution respectively. In this case, a threshold value is not needed, instead, it is only needed to compare calculation performance indexes of all the precoding solutions to select a precoding solution with an optimal calculation performance index. If the calculation performance index is throughput, a precoding solution with a greatest throughput may be selected according to calculation results and determined as the target precoding solution. The preset rule is merely given as an example herein, but not limited thereto.

S104, the base station precodes data information of all the user equipment(s) according to the target precoding solution.

S105, if the target precoding solution determined by the base station is a nonlinear precoding solution, the base station sends the data information and indication signaling indicating information of the nonlinear precoding solution to each user equipment.

The indication signaling may specifically carry the nonlinear precoding solution or a receiver type corresponding to the nonlinear precoding solution, or carry the nonlinear precoding solution and a receiver type corresponding to the nonlinear precoding solution.

It should be noted that, although the precoding technology is a signal pre-processing technology of the base station, in order to ensure correct signal transmission, both transmitting and receiving sides also need to perform certain cooperation. For various linear precoding technologies, common receivers such as a ZF (Zero-Forcing) receiver, an MMSE (Minimum Mean Square Error) receiver and the like are applicable; but different from the linear precoding technology, the nonlinear precoding technology may have some special requirements on a receiver type, for example, a THP (Tomlinson-Harashima Precoding) solution requires that a receiver has a modulus operation capability, so when a certain type of the nonlinear precoding solution is adopted, the base station needs to inform the user equipment of a receiver type needing to be adopted, and the base station may determine whether the receiver type corresponding to the selected precoding solution needs to be carried in the indication signaling according to the selected precoding solution.

It is worth pointing out that, in step S105, the indication signaling sent to the user equipment is divided into three cases, when the indication signaling carries both the nonlinear precoding solution and the receiver type corresponding to the nonlinear precoding solution, the user equipment may select a receiver according to the indicated receiver type and then detect the received data information using the selected receiver, and the indication signaling of the nonlinear precoding solution may be used for indicating a method for channel estimation for the user equipment; when the indication signaling only carries the nonlinear precoding solution, the user equipment may select a receiver according to a receiver type corresponding to the nonlinear precoding solution which is pre-appointed together and detects the received data information using the receiver; when the indication signaling only carries the receiver type corresponding to the nonlinear precoding solution, the user equipment selects a receiver according to the indicated receiver type and then detects the received data information using the selected receiver.

According to the precoding method provided by the embodiment of the present disclosure, the base station acquires the predetermined parameter(s) of at least one user equipment, calculates the predetermined parameter(s) to obtain the calculation performance index, then select the target precoding solution according to the calculation performance index, pre-codes the data information according to the target precoding solution, if the target precoding solution is the nonlinear precoding solution, sends the data information and the indication signaling indicating the information of the nonlinear precoding solution to each user equipment; and the user equipment receives the data information and the indication signaling which are sent by the base station, selects the receiver according the receiver type obtained according to the indication signaling, and detects the received data information using the selected receiver. In this way, the base station may select a precoding solution with the optimal gain effect according to actual conditions in the system, and may indicate the receiver type according to the need of the precoding solution simultaneously to ensure correct reception of transmission, thereby improving the transmission quality of the system, and improving the system performance.

Figure 2:
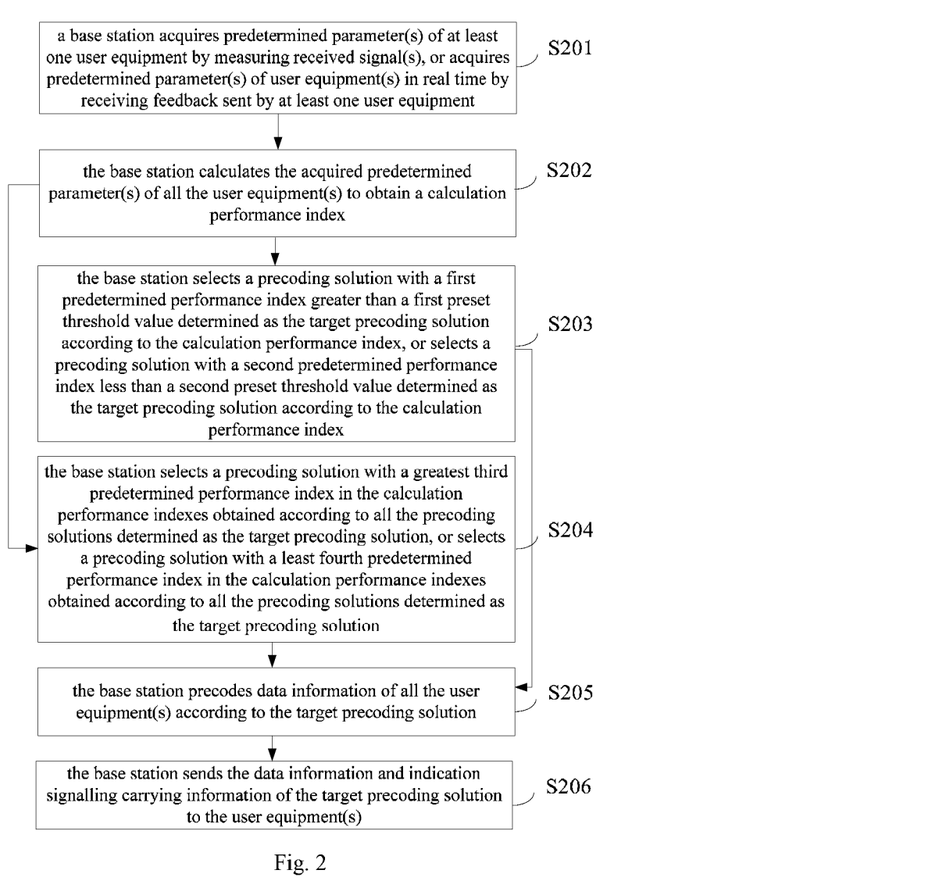
FIG. 2 is a flow schematic diagram of another precoding method provided by an embodiment of the present disclosure.

A precoding method provided by another embodiment of the present disclosure, as shown in FIG. 2, includes the following steps.

S201, a base station acquires predetermined parameter(s) of at least one user equipment by measuring received signal(s), or acquires predetermined parameter(s) of user equipment(s) in real time by receiving feedback sent by at least one user equipment.

It is worth pointing out that, the predetermined parameter(s) may be one or several of parameters of a channel state, a channel quality or an antenna configuration, and the received signal(s) may be a reference signal or a data signal, or a reference signal and a data signal.

S202, the base station calculates the acquired predetermined parameter(s) of all the user equipment(s) to obtain a calculation performance index.

It should be noted that, the base station may calculate according to different types of performance indexes to obtain the calculation performance index; a first type of a performance index is determined according to a channel state of a current channel, and the like, which is unrelated to coding solutions, such as, a channel correlation and the like; and a second type of a performance index is a calculation performance index obtained according to each precoding solution, such as, a throughput of each precoding solution.

When the calculation performance index is the first type, step S203 is executed, and when the calculation performance index is the second type, step S204 is executed.

S203, the base station selects a precoding solution with a first predetermined performance index greater than a first preset threshold value determined as the target precoding solution according to the calculation performance index, or selects a precoding solution with a second predetermined performance index less than a second preset threshold value determined as the target precoding solution according to the calculation performance index.

Exemplarily, the base station may directly calculate a value of a performance index, such as a channel correlation value, and then compare the value with the first preset threshold value, and select a linear precoding solution or a nonlinear precoding solution with the channel correlation greater than the first preset threshold value, or calculate a downlink signal-to-noise ratio, and select a linear precoding solution or a nonlinear precoding solution with the downlink signal-to-noise ratio less than the second preset performance index. For example, it can be seen based on an analysis of simulation FIG. 3 that, the base station selects a ZF-BF linear precoding solution as the target precoding solution only in the case of a low correlation and a high downlink signal-to-noise ratio, and selects a THP nonlinear precoding solution as the target precoding solution in other scenes.

S204, the base station selects a precoding solution with a greatest third predetermined performance index in the calculation performance indexes obtained according to all the precoding solutions determined as the target precoding solution, or selects a precoding solution with a least fourth predetermined performance index in the calculation performance indexes obtained according to all the precoding solutions determined as the target precoding solution.

It should be noted that, the base station obtains the calculation performance index by calculating the acquired predetermined parameter(s) of all the user equipment(s) according to each precoding solution respectively.

Figure 3:
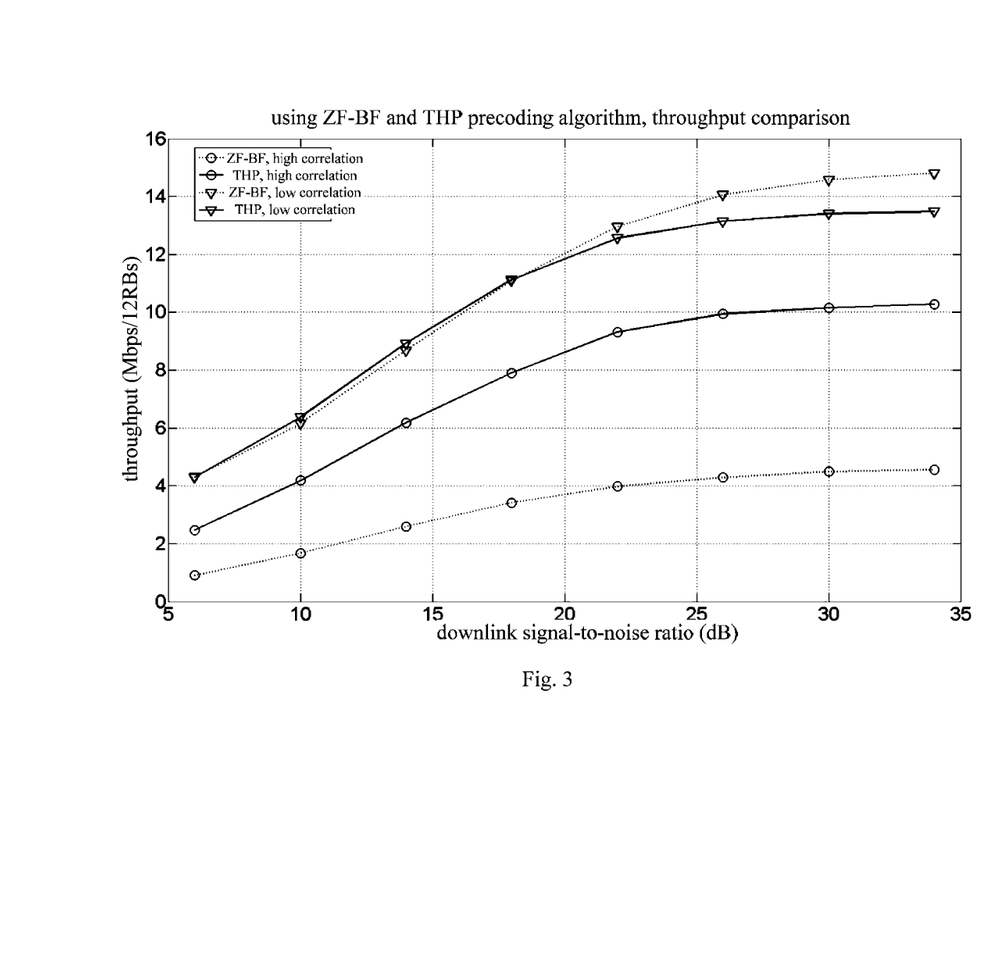
FIG. 3 is a simulation schematic diagram of throughput of linear precoding and nonlinear precoding provided by an embodiment of the present disclosure.

Exemplarily, as shown in FIG. 3, specifically, the base station may select a precoding solution with the greatest throughput as the target precoding solution. In two predefined precoding solutions, one is a linear precoding solution ZF-BF (Zero-Forcing Beamforming), the other one is a nonlinear precoding solution THP. In certain scenes, the nonlinear precoding may indeed provide a better throughput performance than the linear precoding. In the simulation scene of FIG. 3, four user equipments and one base station are arranged, each user equipment has two receiving antennas, the base station has four transmitting antennas, the uplink signal-to-noise ratio is 20 dB, and in a high channel correlation scene and a low channel correlation scene, the throughputs of the linear precoding solution ZF-BF and the nonlinear precoding solution THP are compared by simulation respectively.

In FIG. 3, the horizontal axis is a downlink signal-to-noise ratio, the vertical axis is a total system throughput on 12 RBs (Resource Block). It may be seen from the figure that only in a scene with a low correlation and a high downlink signal-to-noise ratio (the downlink signal-to-noise ratio is about greater than or equal to 18 dB), the throughput performance of the linear precoding solution ZF-BF is greater than that of the nonlinear precoding solution THP, in other scenes, the throughput performance of the nonlinear precoding solution THP is always greater than that of the linear precoding solution ZF-BF, which is particularly obvious in a high correlation scene.

S205, the base station precodes data information of all the user equipment(s) according to the target precoding solution.

S206, the base station sends the data information and indication signaling carrying information of the target precoding solution to the user equipment(s).

Further, if the target precoding solution selected and determined by the base station is a linear precoding solution, the base station sends indication signaling which carries the linear precoding solution and/or a receiver type corresponding to the linear precoding solution to each user equipment. When the receiver type corresponding to the linear precoding solution is carried in the indication signaling, the data information is detected using the type of the receiver; when the corresponding receiver type is not carried in the indication signaling, it is shown that the linear precoding solution has no special requirement on the receiver, so that the user equipment acquires the linear precoding solution according to the indication signaling, and performs detection using a random receiver.

If the target precoding solution selected and determined by the base station is a nonlinear precoding solution, the base station sends the data information and indication signaling which carries the nonlinear precoding solution and/or a receiver type corresponding to the nonlinear precoding solution to the user equipment according to a requirement of the nonlinear precoding solution on a receiver type. For example, when the base station selects the precoding solution THP, the precoding solution THP requires that a receiver has a modulus operation capability, at this time, the base station may send the data information and the indication signaling carrying the precoding solution THP to the user equipment, so that the user equipment selects, according to that the precoding solution THP requires the receiver with the modulus operation capability, which is pre-known by the user equipment and the base station, the type of the receiver to detect the data information; or, the information that the receiver is required to have the modulus operation capability is only carried in the indication signaling, so that the user equipment selects the receiver with the modulus operation capability to detect the data information; or the precoding solution THP and a receiver type corresponding to the precoding solution THP are carried simultaneously.

It is worth pointing out that, the indication signaling sent to the user equipment may be born on a specific RE (Resource Element) of a PDCCH (Physical Downlink Control Channel) for transmission.

According to the precoding method provided by the embodiment of the present disclosure, the base station acquires the predetermined parameter(s) of at least one user equipment, calculates the predetermined parameter(s) to obtain the calculation performance index, then select the target precoding solution according to the calculation performance index, pre-codes the data information according to the target precoding solution, if the target precoding solution is the nonlinear precoding solution, sends the data information and the indication signaling indicating the information of the nonlinear precoding solution to each user equipment; and the user equipment receives the data information and the indication signaling which are sent by the base station, selects the receiver according the receiver type obtained according to the indication signaling, and detects the received data information using the selected receiver. In this way, the base station may select a precoding solution with the optimal gain effect according to actual conditions in the system, and may indicate the receiver type according to the need of the precoding solution simultaneously to ensure correct reception of transmission, thereby improving the transmission quality of the system, and improving the system performance.

Figure 4:
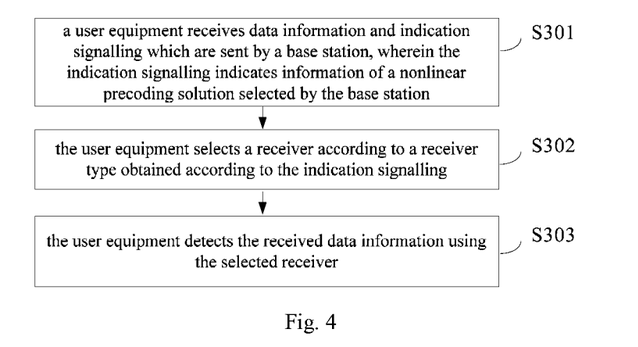
FIG. 4 is a flow schematic diagram of another precoding method provided by an embodiment of the present disclosure.

A precoding method provided by another embodiment of the present disclosure, as shown in FIG. 4, includes the following steps.

S301, a user equipment receives data information and indication signaling which are sent by a base station, wherein the indication signaling indicates information of a nonlinear precoding solution selected by the base station.

Further, the indication signaling may carry the nonlinear precoding solution selected and determined by the base station, and/or a receiver type corresponding to the nonlinear precoding solution.

Exemplarily, when the indication signaling received by the user equipment is born on a specific RE of a PDCCH, the user equipment determines that a target precoding solution is the nonlinear precoding solution or the receiver type correspondingly required by the nonlinear precoding solution, or the nonlinear precoding solution and the receiver type correspondingly required by the nonlinear precoding solution by detecting the specific RE of the PDCCH.

S302, the user equipment selects a receiver according to a receiver type obtained according to the indication signaling.

It is worth pointing out that, the indication signaling sent by the base station includes three cases, and the user equipment performs different processes according to the different cases: when the indication signaling carries the nonlinear precoding solution and the receiver type corresponding to the nonlinear precoding solution, the user equipment may select a receiver according to the indicated receiver type, and then detect the received data information using the selected receiver, and the indication signaling of the nonlinear precoding solution may be used for indicating a method for channel estimation for the user equipment; when the indication signaling only carries the nonlinear precoding solution, the user equipment may select a receiver according to a receiver type corresponding to the nonlinear precoding solution which is pre-appointed by the user equipment and the base station together and detects the data information using the receiver; when the indication signaling only carries the receiver type corresponding to the nonlinear precoding solution, the user equipment selects a receiver according to the indicated receiver type and then detects the received data information using the selected receiver.

S303, the user equipment detects the received data information using the selected receiver.

According to the precoding method provided by the embodiment of the present disclosure, the base station acquires the predetermined parameter(s) of at least one user equipment, calculates the predetermined parameter(s) to obtain the calculation performance index, then select the target precoding solution according to the calculation performance index, pre-codes the data information according to the target precoding solution, if the target precoding solution is the nonlinear precoding solution, sends the data information and the indication signaling indicating the information of the nonlinear precoding solution to each user equipment; and the user equipment receives the data information and the indication signaling which are sent by the base station, selects the receiver according the receiver type obtained according to the indication signaling, and detects the received data information using the selected receiver. In this way, the base station may select a precoding solution with the optimal gain effect according to actual conditions in the system, and may indicate the receiver type according to the need of the precoding solution simultaneously to ensure correct reception of transmission, thereby improving the transmission quality of the system, and improving the system performance.

Figure 5:
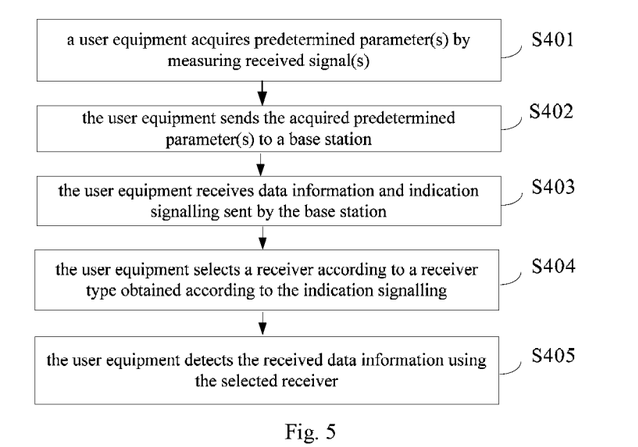
FIG. 5 is a flow schematic diagram of another precoding method provided by an embodiment of the present disclosure.

A precoding method provided by another embodiment of the present disclosure, as shown in FIG. 5, includes the following steps.

S401, a user equipment acquires predetermined parameter(s) by measuring received signal(s).

Exemplarily, the predetermined parameter(s) may be one or several of parameters of a channel state or a channel quality, and the received signal(s) may be a reference signal or a data signal, or a reference signal and a data signal.

Further, the predetermined parameter may also be an antenna configuration, and the user equipment may report it to a base station when accessing to a network.

It is worth pointing out that, each user equipment may obtain one or several parameters of the channel state, the antenna configuration or the channel quality, and then send one or several of the parameters of the channel state, the antenna configuration or the channel quality of itself to the base station, or it may not be sent by the user equipment, but be obtained by the base station by measuring.

S402, the user equipment sends the acquired predetermined parameter(s) to a base station.

S403, the user equipment receives data information and indication signaling sent by the base station.

It should be noted that, when a target precoding solution selected and determined by the base station is a linear precoding solution, the indication signaling carries the linear precoding solution and/or a receiver type corresponding to the linear precoding solution; when a target precoding solution selected and determined by the base station is a nonlinear precoding solution, the indication signaling carries the nonlinear precoding solution and/or a receiver type corresponding to the nonlinear precoding solution.

S404, the user equipment selects a receiver according to a receiver type obtained according to the indication signaling.

Further, when the indication signaling carries the receiver type corresponding to the linear precoding solution or the nonlinear precoding solution selected and determined by the base station, the user equipment selects a receiver according to the receiver type; when the indication signaling does not carry the receiver type corresponding to the linear precoding solution or the nonlinear precoding solution selected and determined by the base station, the user equipment determines a receiver type corresponding to the linear precoding solution or the nonlinear precoding solution according to a corresponding relationship known by the user equipment and the base station together.

It should be noted that, when the indication signaling only carries the linear precoding solution, it is shown that the linear precoding solution has no special requirement on a receiver, so that the user equipment may select a receiver randomly to perform detection.

S405, the user equipment detects the received data information using the selected receiver.

According to the precoding method provided by the embodiment of the present disclosure, the base station acquires the predetermined parameter(s) of at least one user equipment, calculates the predetermined parameter(s) to obtain the calculation performance index, then select the target precoding solution according to the calculation performance index, pre-codes the data information according to the target precoding solution, if the target precoding solution is the nonlinear precoding solution, sends the data information and the indication signaling indicating the information of the nonlinear precoding solution to each user equipment; and the user equipment receives the data information and the indication signaling which are sent by the base station, selects the receiver according the receiver type obtained according to the indication signaling, and detects the received data information using the selected receiver. In this way, the base station may select a precoding solution with the optimal gain effect according to actual conditions in the system, and may indicate the receiver type according to the need of the precoding solution simultaneously to ensure correct reception of transmission, thereby improving the transmission quality of the system, and improving the system performance.

Figure 6:
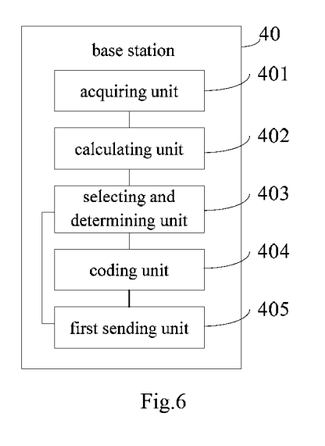
FIG. 6 is a structure schematic diagram of a base station provided by an embodiment of the present disclosure.

A base station 40 provided by an embodiment of the present disclosure, as shown in FIG. 6, includes:

an acquiring unit 401, configured to acquire predetermined parameter(s) of at least one user equipment.

Further, the acquiring unit 401 is further configured to acquire the predetermined parameter(s) of at least one user equipment 50 by measuring received signal(s).

Or, the acquiring unit 401 is further configured to acquire the predetermined parameter(s) of the user equipment 50 in real time by receiving feedback sent by the at least one user equipment.

A calculating unit 402 is configured to calculate the predetermined parameter(s) of all the user equipment 50 acquired by the acquiring unit 401 to obtain a calculation performance index.

Further, the calculating unit 402 may calculate a predetermined performance index according to channel states of all the user equipment 50, such as downlink signal-to-noise ratios and channel correlations; or antenna configurations of all the user equipment 50, such as the numbers of receiving antennas, the numbers of transmitting antennas, polarization modes and the like; or channel qualities of all the user equipment 50, such as CQIs. For example, a throughput value of each precoding or a channel correlation value of the current system may be acquired.

A selecting and determining unit 403 is configured to select and determine a target precoding solution according to the calculation performance index calculated by the calculating unit.

Exemplarily, if the calculating unit 402 calculates a first predetermined performance index unrelated to precoding solutions, such as a channel correlation, the selecting and determining unit 403 is specifically configured to select a linear precoding solution or a nonlinear precoding solution with a channel correlation greater than a first preset threshold value.

Further, if the calculating unit 402 calculates a second predetermined performance index unrelated to precoding solutions, such as a downlink signal-to-noise ratio, the selecting and determining unit 403 is specifically configured to select a linear precoding solution or a nonlinear precoding solution with the second predetermined performance index less than a second preset threshold value, and the specific comparison mode is carried out in the method embodiments and is not described redundantly herein.

In addition, if the calculating unit 402 calculates a throughput according to each precoding solution, the selecting and determining unit 403 is specifically configured to select a precoding solution with a greatest throughput in throughputs obtained according to all the precoding solutions determined as the target precoding solution.

Further, if the calculating unit 402 calculates a calculation performance index according to each precoding solution, a precoding solution with a least fourth predetermined performance index in the calculation performance indexes obtained according to all the precoding solutions is selected and determined as the target precoding solution.

A coding unit 404 is configured to precode data information of all the user equipment 50 according to the target precoding solution determined by the selecting and determining unit 403.

A first sending unit 405 is configured to send, if the target precoding solution selected by the selecting and determining unit 403 is a nonlinear precoding solution, the data information and indication signaling indicating information of the nonlinear precoding solution to each user equipment 50.

The indication signaling may carry the nonlinear precoding solution and/or a receiver type corresponding to the nonlinear precoding solution.

Figure 7:
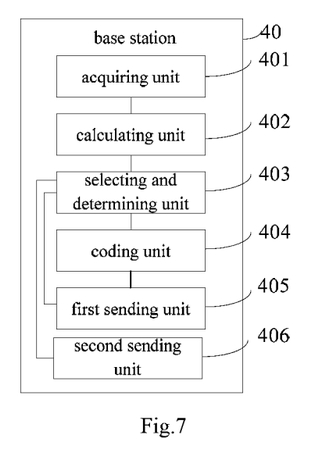
FIG. 7 is a structure schematic diagram of another base station provided by an embodiment of the present disclosure.

It is worth pointing out that, as shown in FIG. 7, the base station further includes:

a second sending unit 406, configured to send, if the target precoding solution is a linear precoding solution, the data information and indication signaling which carries the linear precoding solution and/or a receiver type corresponding to the linear precoding solution to each user equipment.

The base station 40 may work by using the methods provided by the above-mentioned embodiments, and the working methods are similar to the methods provided by the embodiments and not described redundantly herein.

According to the base station provided by the embodiment of the present disclosure, the base station acquires the predetermined parameter(s) of at least one user equipment, calculates the predetermined parameter(s) to obtain the calculation performance index, then select the target precoding solution according to the calculation performance index, pre-codes the data information according to the target precoding solution, if the target precoding solution is the nonlinear precoding solution, sends the data information and the indication signaling indicating the information of the nonlinear precoding solution to each user equipment; and the user equipment receives the data information and the indication signaling which are sent by the base station, selects the receiver according the receiver type obtained according to the indication signaling, and detects the received data information using the selected receiver. In this way, the base station may select a precoding solution with the optimal gain effect according to actual conditions in the system, and may indicate the receiver type according to the need of the precoding solution simultaneously to ensure correct reception of transmission, thereby improving the transmission quality of the system, and improving the system performance.

Figure 8:
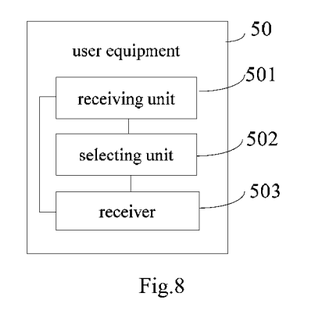
FIG. 8 is a structure schematic diagram of a user equipment provided by an embodiment of the present disclosure.

A user equipment 50 provided by an embodiment of the present disclosure, as shown in FIG. 8, includes:

a receiving unit 501, configured to receive data information and indication signaling which are sent by a base station 40, wherein the indication signaling indicates information of a nonlinear precoding solution selected and determined by the base station.

The indication signaling may carry the nonlinear precoding solution selected and determined by the base station 40 and/or a receiver type corresponding to the nonlinear precoding solution.

Or, the receiving unit 501 is further configured to receive data information and indication signaling which are sent by the base station 40, the indication signaling carries a linear precoding solution selected and determined by the base station 40 and/or a receiver type corresponding to the linear precoding solution.

A selecting unit 502 is configured to select a receiver 503 according to a receiver type obtained according to the indication signaling received by the receiving unit 501.

Exemplarily, the selecting unit 502 is configured to select, when the indication signaling received by the receiving unit 501 carries the nonlinear precoding solution selected and determined by the base station 40, and/or the receiver type corresponding to the nonlinear precoding solution, the receiver 503 according to the receiver type to detect the data information received by the receiving unit 501.

Or, the selecting unit 502 is configured to select, when the indication signaling received by the receiving unit 501 carries the linear precoding solution selected and determined by the base station 40, and/or the receiver type corresponding to the linear precoding solution, the receiver 503 according to the receiver type to detect the data information received by the receiving unit 501.

Figure 9:
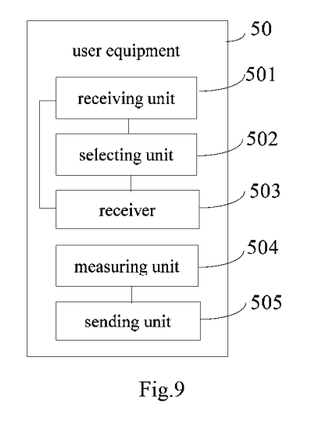
FIG. 9 is a structure schematic diagram of another user equipment provided by an embodiment of the present disclosure.

Further, the user equipment 50, as shown in FIG. 9, further includes:

a measuring unit 504, configured to acquire predetermined parameter(s) by measuring received signal(s).

Exemplarily, the measuring unit 504 obtains a channel state by measuring the received signal(s) and calculating the measured result, or obtains a parameter of a channel quality and the like by measuring the received signal(s) and calculating the measured result, and the above-mentioned received signal(s) may be a reference signal and/or a data signal.

A sending unit 505 is configured to send the acquired predetermined parameter(s) to the base station 40.

Exemplarily, the acquired predetermined parameter(s) includes the above-mentioned channel state or channel quality, or channel state and channel quality, and may also include an antenna configuration of the user equipment 50, and the antenna configuration is a known parameter of the user equipment.

The user equipment 50 may work by using the methods provided by the above-mentioned embodiments, and the working methods are similar to the methods provided by the embodiments and not described redundantly herein.

According to the user equipment provided by the embodiment of the present disclosure, the base station acquires the predetermined parameter(s) of at least one user equipment, calculates the predetermined parameter(s) to obtain the calculation performance index, then select the target precoding solution according to the calculation performance index, pre-codes the data information according to the target precoding solution, if the target precoding solution is the nonlinear precoding solution, sends the data information and the indication signaling indicating the information of the nonlinear precoding solution to each user equipment; and the user equipment receives the data information and the indication signaling which are sent by the base station, selects the receiver according the receiver type obtained according to the indication signaling, and detects the received data information using the selected receiver. In this way, the base station may select a precoding solution with the optimal gain effect according to actual conditions in the system, and may indicate the receiver type according to the need of the precoding solution simultaneously to ensure correct reception of transmission, thereby improving the transmission quality of the system, and improving the system performance.

It should be appreciated for those of ordinary skill in the art that all or a part of the procedures in the above-mentioned embodiments of a method may be implemented with a computer program instructing corresponding hardware. The above-mentioned program may be stored in a computer readable storage medium. The procedures of the embodiments of the respective methods mentioned above may be included when the program is executed; and the above-mentioned storage medium includes various kinds of medium that may store program codes, such as a ROM, a RAM, a magnetic disk, an optical disk, or the like.

The foregoing descriptions are merely specific implementation manners of the disclosure, rather than limiting the protection scope of the disclosure. Any change or substitution that is readily conceived for any one skilled in the art within the technical scope disclosed by the disclosure shall fall into the protection scope of the disclosure. Therefore, the protection scope of the present disclosure shall be defined by the claims.

What is claimed is:

1. A precoding method, comprising:
   acquiring one or more predetermined parameter(s) of at least one user equipment;
   calculating a calculation performance index using the acquired predetermined parameter(s) of all the user equipment(s);
   selecting a target precoding solution according to the calculation performance index;
   precoding data information of all the user equipment(s) according to the target precoding solution; and
   sending, if the target precoding solution is a nonlinear precoding solution, the data information and indication signaling carrying information about the nonlinear precoding solution to each user equipment;
   wherein the calculating comprises:
   calculating the acquired predetermined parameter(s) of all the user equipment(s) according to each of a plurality of precoding solutions to obtain the calculation performance index;
   wherein the selecting comprises:
   selecting a precoding solution with a greatest third predetermined performance index in calculation performance indexes obtained according to all the precoding solutions determined as the target precoding solution; or
   selecting a precoding solution with a least fourth predetermined performance index in calculation performance indexes obtained according to all the precoding solutions determined as the target precoding solution.

2. The method of claim 1, wherein the acquiring one or more predetermined parameter(s) of the at least one user equipment comprises one of the following:
   acquiring the predetermined parameter(s) of the at least one user equipment by measuring received signal(s); and
   acquiring the predetermined parameter(s) of the user equipment(s) in real time by receiving feedback sent by the at least one user equipment.

3. The method of claim 1, wherein the one or more predetermined parameter(s) comprises at least one of a channel state and a channel quality.

4. The method of claim 1, wherein the indication signaling carries at least one of the nonlinear precoding solution and a receiver type corresponding to the nonlinear precoding solution.

5. The method of claim 1, further comprising:
   sending, if the target precoding solution is a linear precoding solution, the data information and indication signaling which carries at least one of the linear precoding solution and a receiver type corresponding to the linear precoding solution to each user equipment.

6. The method of claim 1, wherein the indication signaling sent to each user equipment is created by a resource element (RE) of a physical downlink control channel (PDCCH) for transmission.

7. A precoding method, comprising:
   receiving data information and indication signaling which are sent by a base station, wherein the indication signaling carries information about a nonlinear precoding solution selected by the base station, wherein the nonlinear precoding solution corresponds to a greatest third predetermined performance index or a least fourth predetermined performance index in calculation performance indexes which are obtained by calculating predetermined parameter(s) of all user equipment(s) according to each of a plurality of precoding solutions;
   selecting a receiver according to a receiver type obtained according to the indication signaling; and
   detecting the received data information using the selected receiver.

8. The method of claim 7, further comprising, before the receiving the data information and the indication signaling which are sent by the base station:
acquiring predetermined parameter(s) by measuring received signal(s); and
sending the acquired predetermined parameter(s) to the base station.

9. The method of claim 8, wherein the predetermined parameter(s) comprises at least one of a channel state and a channel quality.

10. The method of claim 7, wherein the information of the nonlinear precoding solution carried by the indication signaling comprises at least one of the nonlinear precoding solution and a receiver type corresponding to the nonlinear precoding solution.

11. The method of claim 7, further comprising:
receiving data information and indication signaling which are sent by the base station, wherein the indication signaling carries at least one of a linear precoding solution selected by the base station and a receiver type corresponding to the linear precoding solution;
selecting a receiver according to a receiver type obtained according to the indication signaling; and
detecting the received data information using the selected receiver.

12. A base station, comprising:
a processor configured to acquire one or more predetermined parameter(s) of at least one user equipment;
the processor, configured to calculate a calculation performance index using the predetermined parameter(s) of all the user equipment(s) acquired by the acquiring it processor;
the processor configured to select a target precoding solution according to the calculation performance index calculated by the processor;
the processor configured to precode data information of all the user equipment(s) according to the target precoding solution determined by the processor; and
a transceiver configured to send, if the target precoding solution is a nonlinear precoding solution, the data information and indication signaling carrying information about the nonlinear precoding solution to each user equipment;
wherein the processor is configured to calculate the predetermined parameter(s) of all the user equipment(s) acquired according to each of a plurality of precoding solutions to obtain the calculation performance index;
select a precoding solution with a greatest third predetermined performance index in calculation performance indexes obtained according to all the precoding solutions determined as the target precoding solution; or
select a precoding solution with a least fourth predetermined performance index in calculation performance indexes obtained according to all the precoding solutions determined as the target precoding solution.

13. The base station of claim 12, wherein the processor is configured to acquire the predetermined parameter(s) of the at least one user equipment by measuring received signal(s), or acquire the predetermined parameter(s) of the user equipment(s) in real time by receiving feedback sent by the at least one user equipment.

14. The base station of claim 12, wherein the transceiver is configured to send, if the target precoding solution is the nonlinear precoding solution, the data information and the indication signaling which carries at least one of the nonlinear precoding solution and a receiver type corresponding to the nonlinear precoding solution to each user equipment.

15. The base station of claim 12, wherein the transceiver is further configured to send, if the target precoding solution is a linear precoding solution, the data information and indication signaling which carries at least one of the linear precoding solution and a receiver type corresponding to the linear precoding solution to each user equipment.

16. A user equipment, comprising:
a transceiver, configured to receive data information and indication signaling which are sent by a base station, wherein the indication signaling carries information about a nonlinear precoding solution selected by the base station, wherein the precoding solution corresponds to a greatest third predetermined performance index or a least fourth predetermined performance index in calculation performance indexes which are obtained by calculating predetermined parameter(s) of all user equipment(s) according to each of a plurality of precoding solutions;
a selecting unit processor configured to select a receiver according to a receiver type obtained according to the indication signaling received by the transceiver; and
the selected receiver, configured to detect the data information received by the transceiver.

17. The user equipment of claim 16, further comprising:
the processor configured to acquire one or more predetermined parameter(s) by measuring received signal(s); and
a transceiver configured to send the acquired predetermined parameter(s) to the base station.

18. The user equipment of claim 16, wherein the transceiver is configured to receive the data information and the indication signaling which are sent by the base station, wherein the indication signaling carries at least one of the nonlinear precoding solution selected by the base station and a receiver type corresponding to the nonlinear precoding solution.

19. The user equipment of claim 16, wherein the transceiver is further configured to receive data information and indication signaling which are sent by the base station, wherein the indication signaling carries at least one of a linear precoding solution selected by the base station and a receiver type corresponding to the linear precoding solution;
the processor is further configured to select a receiver according to a receiver type obtained according to the indication signaling; and
the selected receiver is configured to detect the data information received by the transceiver.

* * * * *

UNITED STATES PATENT AND TRADEMARK OFFICE
CERTIFICATE OF CORRECTION

| | | |
|---|---|---|
| PATENT NO. | : 9,660,707 B2 | Page 1 of 1 |
| APPLICATION NO. | : 14/476276 | |
| DATED | : May 23, 2017 | |
| INVENTOR(S) | : Yan et al. | |

It is certified that error appears in the above-identified patent and that said Letters Patent is hereby corrected as shown below:

In the Claims

Column 15, Lines 30-31, "by the acquiring it processor" should read -- by the processor --.

Column 16, Line 29, "a selecting unit processor" should read -- a processor --.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*